(12) United States Patent
Sannes

(10) Patent No.: US 11,814,095 B2
(45) Date of Patent: *Nov. 14, 2023

(54) STOCKING CART AND METHOD OF TRANSPORTING ITEMS USING THE SAME

(71) Applicant: Walmart Apollo, LLC, Bentonville, AR (US)

(72) Inventor: Morgan Sannes, Conshohocken, PA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,690

(22) Filed: Jan. 24, 2023

(65) Prior Publication Data

US 2023/0159074 A1 May 25, 2023

Related U.S. Application Data

(63) Continuation of application No. 17/736,604, filed on May 4, 2022, now Pat. No. 11,643,124, which is a continuation of application No. 16/654,703, filed on Oct. 16, 2019, now Pat. No. 11,325,626.

(60) Provisional application No. 62/746,275, filed on Oct. 16, 2018.

(51) Int. Cl.
*B62B 3/02* (2006.01)
*B62B 3/00* (2006.01)
*B62B 3/06* (2006.01)

(52) U.S. Cl.
CPC ............... *B62B 3/02* (2013.01); *B62B 3/005* (2013.01); *B62B 3/0606* (2013.01)

(58) Field of Classification Search
CPC .......... B62B 3/02; B62B 3/005; B62B 3/002; B62B 3/0606; B62B 3/04
See application file for complete search history.

(56) References Cited

U.S. PATENT DOCUMENTS

| | | | | |
|---|---|---|---|---|
| 4,159,831 A | * | 7/1979 | Schorr | B62B 3/004 |
| | | | | 211/49.1 |
| 5,947,494 A | * | 9/1999 | Thogersen | A47B 31/06 |
| | | | | 280/47.35 |
| 6,655,892 B2 | * | 12/2003 | Strohfus | B62B 3/003 |
| | | | | 414/334 |

(Continued)

OTHER PUBLICATIONS

"Parcel Roll Container MODULette® 2.0," LKE Group, pp. 1-2.

(Continued)

*Primary Examiner* — John D Walters
(74) *Attorney, Agent, or Firm* — Morgan, Lewis & Bockius LLP; Manita Rawat

(57) ABSTRACT

The embodiments described herein are directed to a cart and related methods. The cart includes a base, a plurality of wheels connected to the base, a lower platform mounted to the base, a back panel mounted to the base, a set of lateral panels, an opening side of the cart, and a linking mechanism. The set of lateral panels defines an interior space of the cart. At least one of the set of lateral panels includes a shelf. The shelf is pivotally mounted to a rectangular frame of the at least one of the set of lateral panels. The opening side of the cart is open to provide access to the interior space of the cart. The linking mechanism is configured and arranged to connect the cart to another cart.

20 Claims, 12 Drawing Sheets

(56) References Cited

U.S. PATENT DOCUMENTS

| | | | |
|---|---|---|---|
| 7,192,237 B2 | 3/2007 | Strohfus et al. | |
| 8,931,420 B2 * | 1/2015 | Larson | B65D 19/42 |
| | | | 108/54.1 |
| 9,333,978 B2 | 5/2016 | Lato et al. | |
| 10,364,065 B2 * | 7/2019 | Raninen | B65D 19/0095 |
| 10,766,516 B2 * | 9/2020 | Finstad | B62B 3/002 |

OTHER PUBLICATIONS

"Canada Post's New Delivery Carts, Postal Transformation," https://www.youtube.com!watch?v=Rf_fBCcvkaA, Aug. 11, 2009, 1 page.
"Pack Mule Towable Cargo Cart, Pack Mule," 2014, pp. 1-6.
"Foldable enclosed wire mesh security rolling cage trolley," Atoggi, Jul. 20, 2018, pp. 1-6.

* cited by examiner

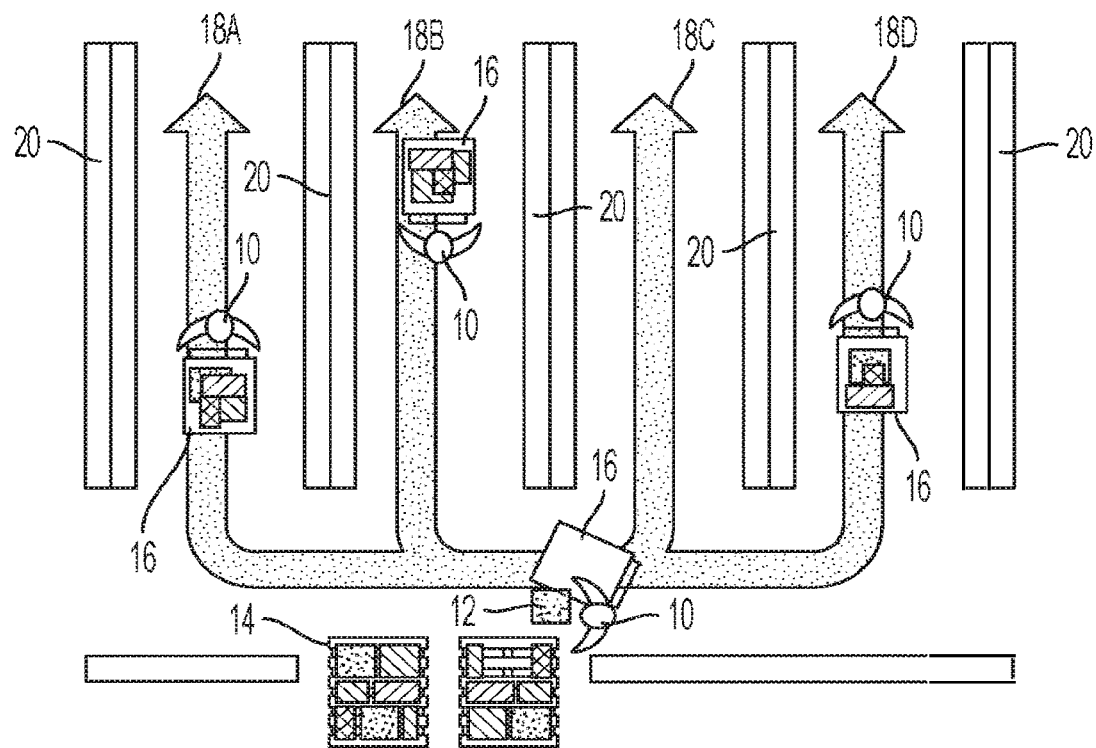
FIG. 1
(CONVENTIONAL)

STOCKING CART AND METHOD OF TRANSPORTING ITEMS USING THE SAME

CROSS-REFERENCE TO RELATED APPLICATIONS

This application is a continuation of U.S. patent application Ser. No. 17/736,604, filed May 4, 2022, which is a continuation of U.S. patent application Ser. No. 16/654,703 filed Oct. 16, 2019, now U.S. Pat. No. 11,325,626, which claims priority to U.S. Provisional Application No. 62/746,275, filed Oct. 16, 2018. The entire disclosures of the applications referenced above are incorporated by reference.

BACKGROUND

1. Technical Field

The present disclosure relates generally to stocking carts and more specifically to linkable stocking carts.

2. Introduction

Wheeled stocking carts are often used for transporting or carrying items (e.g., packages) between two locations. For example, carts may be used to transport items from a delivery truck or other transport vehicle or conveyor system to a storage facility such as a warehouse or fulfillment center for storing the items on shelves, or vice versa, to transport the items from the storage facility to a delivery point or conveyor system.

Present wheeled stocking carts are single wheeled stocking carts that are limited in size due to the limited space in aisles so as to allow the cart to be rolled freely in the aisles between shelves in the storage facility. The term "single" is used herein to mean that the wheeled stocking cart has a single lower platform or base structure. Because the single wheeled stocking cart has a predefined size, the wheeled stocking cart is only capable of carrying a limited number of items (e.g., packages). FIG. 1 depicts schematically a conventional system and process for stocking items (e.g., packages) onto shelves in a storage facility. In a current stocking process, illustrated in FIG. 1, a stocker 10 unloads items 12 from a package delivery system 14 (e.g., from a lift or conveyor system) and loads the items 12 to wheeled single cart 16 and travels to a designated aisle 18A, 18B, 18C or 18D by pushing the wheeled single cart 16. The stocker 10 then picks up and stocks the items 12 on shelves 20 until the cart 16 is emptied from all the items. The stocker 10 repeats this operation numerous times. Therefore, the present stocking process is tedious and has limited productivity because 1) the stocker 10 is required to unload the items from the package delivery system 14 and load the items to the wheeled cart 16 before moving to a designated aisle 18A, 18B, 18C or 18D; and 2) the wheeled single cart 16 has limited carrying capacity requiring the stocker 10 to repeat the transfer between the delivery system 14 to the cart 16 and moving to the aisles 18A, 18B, 18C, 18D for unloading into the shelves 20 numerous times.

Therefore, there is a need for a novel wheeled cart system and process for transporting items to shelves to increase throughput and enhance productivity.

SUMMARY

An aspect of the present disclosure is to provide a stocking cart, including a base structure having an opening configured to receive forks of a forklift; a plurality of wheels connected to the base structure; a lower platform mounted to the base structure, the lower platform being configured to support a weight of items; a back panel mounted to the base structure and extending opposite from the plurality of wheels, the back panel having a frame, the back panel forming a first lateral side of the cart; first and second lateral panels mounted to the base structure, the lateral panels forming a second lateral side and a third lateral side of the cart, the first and second lateral panels and the back panel defining an interior space of the cart; and at least one strap provided on a fourth side of the cart, the fourth side being open to provide access to the interior space of the cart to load items to or unload items from the cart, the at least one strap being configured to hold one or more items inside the cart. The stocking cart further includes a linking mechanism configured and arranged to connect the cart to another cart such that the fourth side of the cart faces a fourth side of the other cart. The linking mechanism comprises at least one latch that is mounted to a first frame of the first lateral panel or to a second frame of the second lateral panel or both, the at least one latch being configured to slide up and down on the first frame of the first panel or the second frame of the second panel.

Another aspect of the present disclosure is to provide s method of transporting items using linked stocking carts. The method includes receiving pre-loaded and linked first and second stocking carts at a desired location in a storage facility, the first and second stocking carts being linked together using a linking mechanism provided on the first stocking cart, the first stocking cart or both; unlinking the first stoking cart and the second stocking cart from each other to separate the first and second stocking carts; rolling the first and second stocking carts separately to designated aisles between shelves in the storage facility; and unloading the first and second stocking carts and loading the items on the shelves.

A further aspect of the present disclosure is to provide a transport system having a plurality of linked stocking carts. The system includes a first stocking cart and a second stocking cart linked to the first stocking cart. The first stocking cart and the second stocking cart include a base structure having an opening configured to receive forks of a forklift; a plurality of wheels connected to the base structure; a lower platform mounted to the base structure, the lower platform being configured to support a weight of items; a back panel mounted to the base structure, the back panel having a frame, the back panel forming a first lateral side of the first stocking cart or the second stocking cart; first and second lateral panels mounted to the base structure, the lateral panels forming a second lateral side and a third lateral side of the first stocking cart or the second stocking cart, the first and second lateral panels and the back panel defining an interior space of the first stocking cart or the second stocking cart; at least one strap provided on a fourth side of the first stocking cart or the second stocking cart, the fourth side being open to provide access to an interior space of the first stocking cart or the second stocking cart to load items to or unload items from the first stocking cart or the second stocking cart, the at least one strap being configured to hold one or more items inside the first stocking cart or the second stocking cart; and a linking mechanism configured and arranged to connect the first stocking cart to the second stocking cart such that the fourth side of the first stocking cart faces the fourth side of the second stocking cart.

Additional features and benefits of the disclosure will be set forth in the description which follows, and in part will be obvious from the description, or can be learned by practice of the herein disclosed principles. The features and benefits of the disclosure can be realized and obtained by means of the instruments and combinations particularly pointed out in the appended claims. These and other features of the disclosure will become more fully apparent from the following description and appended claims, or can be learned by the practice of the principles set forth herein. It is to be expressly understood, however, that the drawings are for the purpose of illustration and description only and are not intended as a definition of the limits of the disclosure.

BRIEF DESCRIPTION OF THE DRAWINGS

FIG. 1 depicts schematically a conventional system and process for stocking items (e.g., packages) onto shelves in a storage facility;

DETAILED DESCRIPTION

Figure 2:
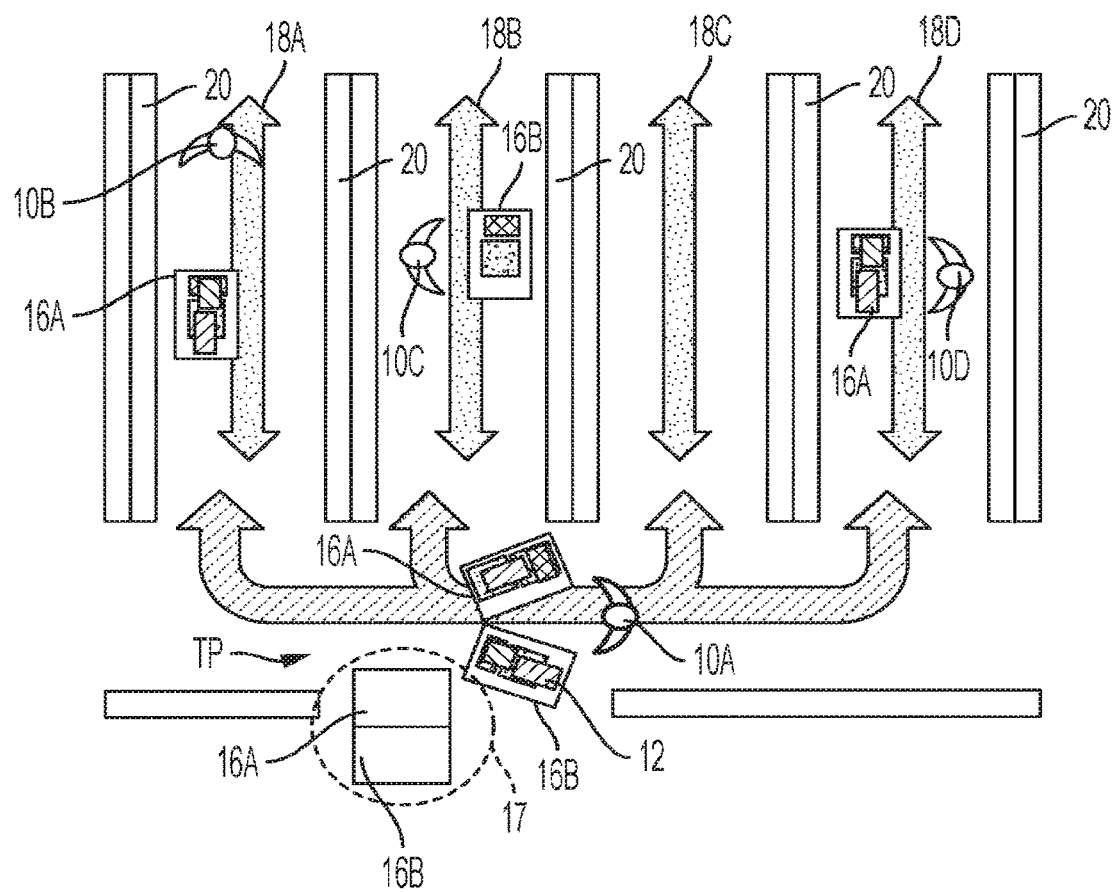
FIG. 2 depicts schematically a system and process for stocking items onto shelves in a storage facility, according to an embodiment of the present disclosure.

FIG. 2 depicts schematically a system and process for stocking items onto shelves in a storage facility, according to an embodiment of the present disclosure. In this embodiment, the wheeled stocking cart includes a plurality of wheeled stocking carts 16A and 16B (for example, two carts) that are linked together so as to form a unitary carrying cart structure 17. As shown in FIG. 2, two wheeled carts 16A and 16B are attached together so as to effectively double the carrying capacity of the cart. Contrary to the conventional system and process depicted in FIG. 1, instead of using a separate delivery system 14, the items 12 are preloaded onto the wheeled linked carts 16A and 16B prior to arriving at a transfer point TP. In an embodiment, the linked carts 16A and 16B together are configured to carry a full palette or rack of items/products. For example, the linked wheeled carts 16A, 16B containing the items 12 can be transported, lifted using a forklift, or simply rolled to the transfer point TP. At the point of transfer TP, for example when the preloaded linked wheeled carts 16A, 16B forming a unitary cart structure 17 reach a desired level in the storage facility, a stocker 10A can unlink the carts 16A and 16B to separate the carts 16A and 16B to allow the carts 16A and 16B to be individually rolled to designated aisles 18A, 18B, 18C, and/or 18D in the storage facility. By unlinking the carts 16A and 16B, each cart 16A, 16B can made to fit for rolling in aisle 18A, 18B, 18C, 18D as the space in the aisles between the shelves is limited. The aisles 18A, 18B, 18C and 18D have predefined width and can only allow stocking carts of predetermined size. Each cart 16A, 16B is configured and sized so as to fit within aisle 18A, 18B, 18C and 18D. Each cart 16A and 16B can be rolled by the same stocker 10A or may be handed to another stocker 10B, 10C, 10D for moving the cart 16A, 16B to the intended aisle 18A, 18B, 18C, 18D.

As a result, in the present stocking process, as shown in FIG. 2, a stocker 10A does not perform any unloading of items 12 from a package delivery system 16 (e.g., from a lift or conveyor system) at the delivery or transfer point TP. Furthermore, the stocker 10A also does not load the items 12 to wheeled carts 16A and 16B at the transfer point TP because the wheeled carts 16A and 16B are preloaded with items 12 at another location prior to arriving at the transfer point TP. As a result, the present stocking process is more efficient as 1) the stocker 10A does not unload the items 12 from the package delivery system 14 and then load the items 12 to the wheeled carts 16A, 16B; and 2) the linked carts 16A and 16B are pre-loaded with items 12 which eliminates a need to repeat loading of the wheeled cart (e.g., cart 16A) with items from the package delivery system 14 at the transfer point TP. Hence this process eliminates inefficient steps in the conventional process and system and renders the overall system and process more efficient, while providing the same functionality. Another parameter for increased efficiency in the present process and system is the fact that the carts are unlinked and split into two carts 16A, 16B by the first stocker 10A allowing two stockers 10B and 10C to separately move the carts 16A, 16B to appropriate aisles. This, in fact, divides the processing task into two thus increasing throughput (e.g., doubling throughput). An analogy can be made to a multicore processor in a computer wherein each core can handle a process or thread thus enable parallel processing of multiple threads for an increased throughput and efficiency.

Figure 3:
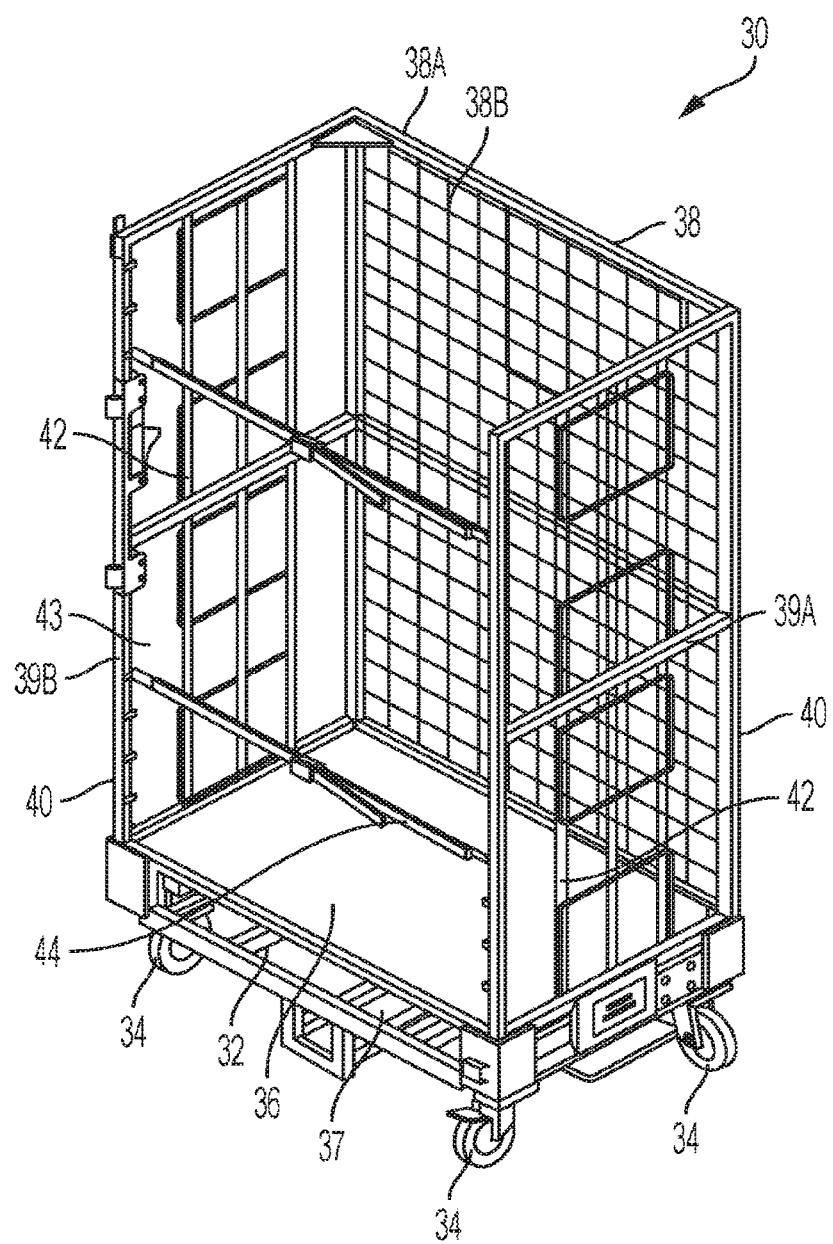
FIG. 3 is a perspective view of a wheeled stocking cart, according to an embodiment of the present disclosure.
Figure 4:
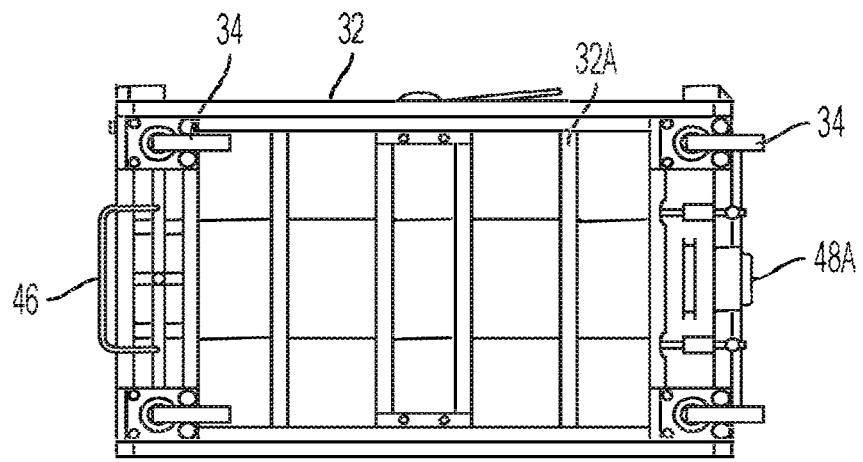
FIG. 4 depicts an underside of a base structure of the stocking cart, according to an embodiment of the present disclosure.

In the following paragraphs, a wheeled cart (stocking cart) that is configured to be linked to another wheeled cart will be described in detail. FIG. 3 is a perspective view of a wheeled stocking cart 30, according to an embodiment of the present disclosure. The cart 30 comprises a base structure 32. In an embodiment, the base structure 32 can be made of metal (e.g., aluminum, steel, etc.). FIG. 4 depicts an underside of the base structure 32, according to an embodiment of the present disclosure. The base structure 32 can be made of an assembly of rods 32A linked using fasteners or soldered together. A plurality of wheels 34 are connected to the base structure 32. For example, as shown in FIGS. 3 and 4, four wheels 34 are mounted to the base structure 32. Although four wheels 34 are illustrated herein, as it can be appreciated, five, six, or more or less wheels can also be provided if desired.

Figure 5:
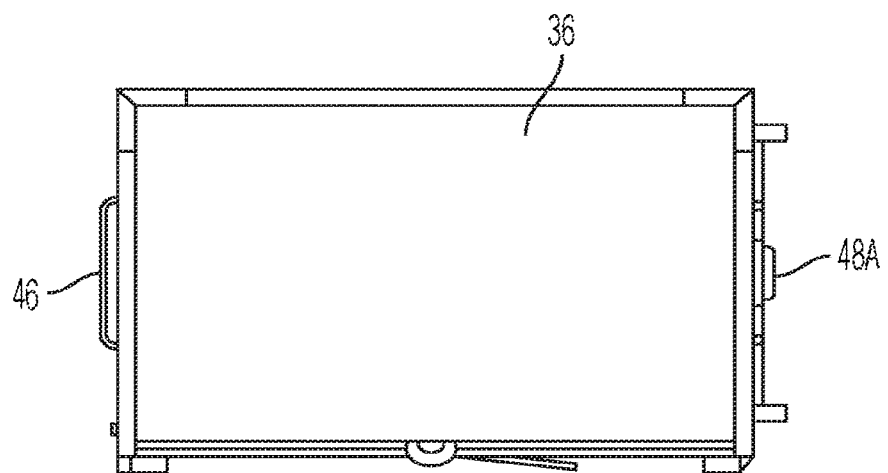
FIG. 5 is a top view of the stocking cart a showing a lower platform of the stocking cart, according to an embodiment of the present disclosure.

The cart 30 also includes a lower platform 36. FIG. 5 is a top view of the cart 30 showing the lower platform 36, according to an embodiment of the present disclosure. The lower platform 36 is mounted to the base structure 32. The lower platform 36 is configured to support the weight of items (not shown in this Figure). The lower platform 36 can be made of any sturdy material such as, but not limited to, metal, plastic, wood or a composite material, or any combination thereof. The base structure 32 has a rectangular opening 37 (shown in FIG. 3) configured to receive the forks of a forklift.

Figure 6:
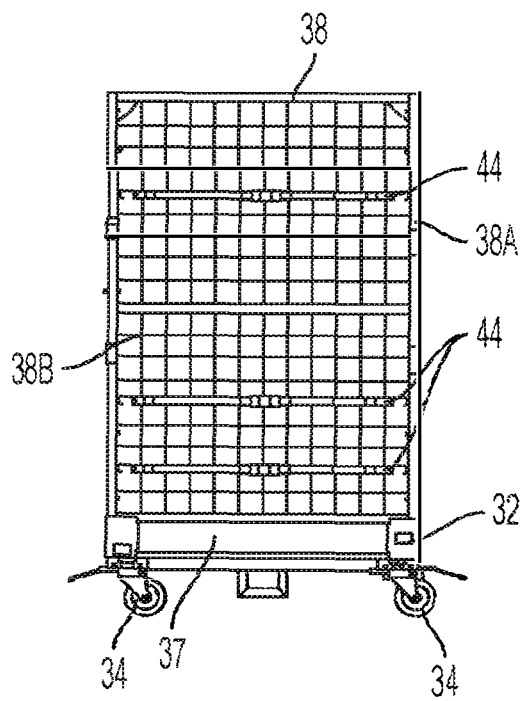
FIG. 6 depicts a front view of the stocking cart showing a back panel of the stocking cart, according to an embodiment of the present disclosure.

The cart 30 also has a back panel 38 mounted to the base structure 32. FIG. 6 depicts a front view of the cart 30 showing the back panel 38, according to an embodiment of the present disclosure. In an embodiment, the back panel 38 can be made, for example, from metal (e.g. aluminum, steel, etc.). In an embodiment, the back panel 38 can have a rectangular frame 38A and a mesh screen 38B attached to the rectangular frame 38A. In an embodiment, the rectangular frame 38A can be made from metal (e.g., aluminum) and the mesh screen 38B can be made from metal (e.g., aluminum), plastic or other composite material.

Figures 7A, 7B:
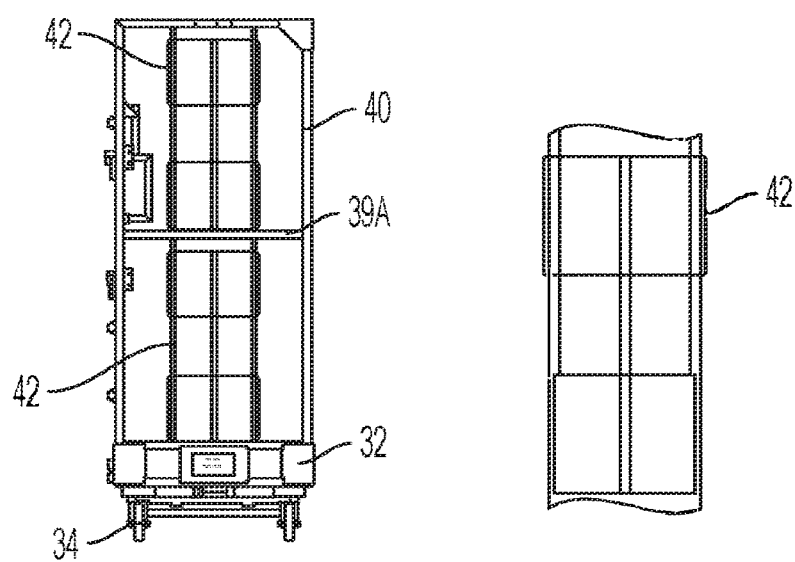
FIG. 7A depicts a lateral view of the stocking cart showing a lateral panel of the stocking cart, according to an embodiment of the present disclosure.
FIG. 7B further shows one sub-panel (grid-panel) when removed from the lateral panel shown in FIG. 7A, according to an embodiment of the present disclosure.

The cart 30 also has two lateral panels 39A and 39B that are mounted to the base structure 32. FIG. 7A depicts a lateral view of the cart 30 showing the lateral panel 39A, according to an embodiment of the present disclosure. The two lateral panels 39A and 39B can also be connected to the back panel 38 if desired to provide additional support. Fasteners can be used to attach the lateral panels 39A and 39B to the base structure 32 and to the back panel 38. The two lateral panels 39A and 39B have a rectangular frame 40 made of metal (e.g., aluminum). The lateral panel 39A or the lateral panel 39B, or both may be provided with sub-panels (e.g., grid-panels) 42 that are removably mounted to the rectangular frame 40. FIG. 7B further shows one sub-panel (grid-panel) 42 when removed from the lateral panel 39A or 39B, according to an embodiment of the present disclosure. The removable sub-panels (grid-panels) 42 can be removed to provide additional access to the inside of the cart 30 to load or unload items.

Figure 14A:
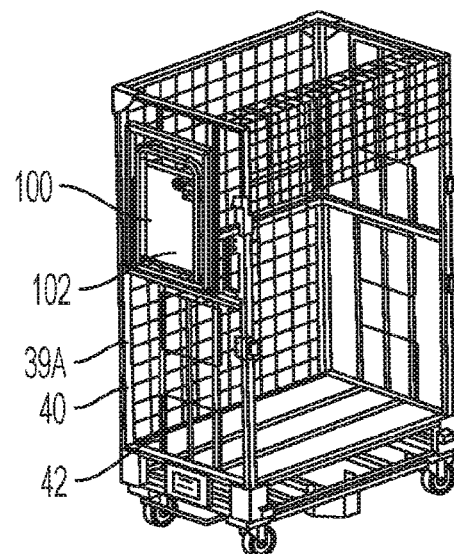
FIG. 14A depicts a perspective view of the cart showing the lateral panel having a shelf in a closed configuration, according to another embodiment of the present disclosure.

FIG. 14A depicts a perspective view of the cart 30 showing the lateral panel 39A having a shelf 100 in a closed configuration, according to another embodiment of the present disclosure. The shelf 100 is mounted to the lateral panel 39A or lateral panel 39B. For example, as shown in FIG. 14A, the shelf 100 can be mounted to the rectangular frame 40 of the lateral panel 39A instead of one of the sub-panels (grid-panels) 42. For example, a grid-panel 42 can be provided at a lower half of the lateral panel 39 whereas the shelf 100 can be provided at an upper half of the lateral panel 39. The shelf 100 includes a platform 102. The platform 102 can be made from a metal such as aluminum or other material such as wood, plastic or other composite material. The shelf 100 is pivotally mounted to rectangular frame 40 of the lateral panel 39A. The shelf 100 is shown in FIG. 14A in a closed configuration vertically arranged against the rectangular frame 40 of the lateral panel 39A.

Figure 14B:
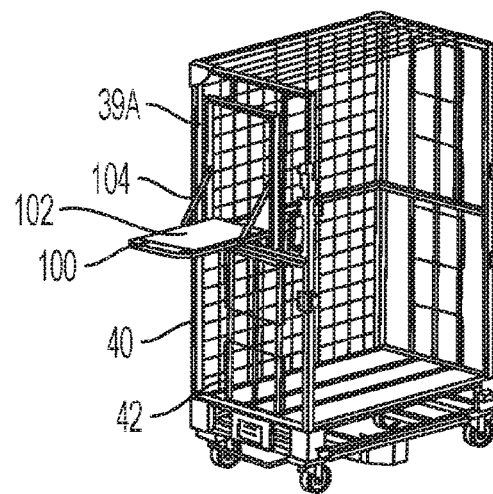
FIG. 14B depicts a perspective view of the cart showing the lateral panel having the shelf in an open configuration, according to another embodiment of the present disclosure.

FIG. 14B depicts a perspective view of the cart 30 showing the lateral panel 39A having the shelf 100 in an open configuration, according to another embodiment of the present disclosure. As shown in FIG. 14B, the shelf 100 can pivot out of the vertical arrangement (shown in FIG. 14A) to a horizontal arrangement wherein the platform 102 of the shelf 100 extends horizontally and substantially perpendicularly to a plane defined by the rectangular frame 40. In an embodiment, the shelf 100 can be supported by two arms 104 that are attached to the lateral panels 39A. The shelf 100 can be used as a workspace to a user to place an object such as a package.

Figure 15A:
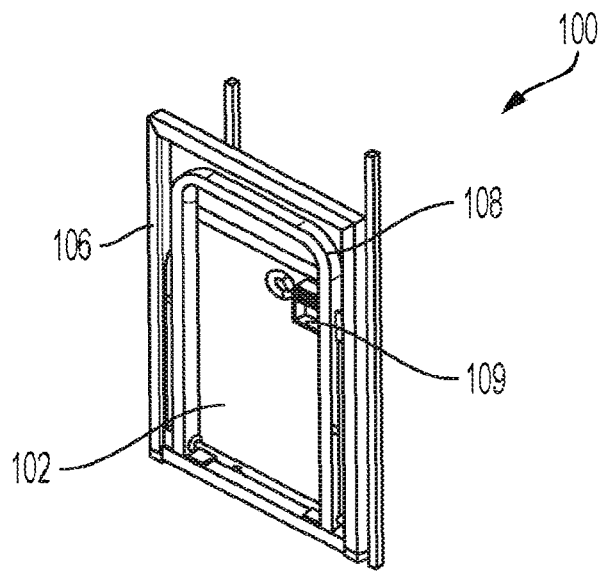
FIG. 15A depicts a perspective view of the shelf in the closed configuration, according to an embodiment of the present disclosure.
Figure 15B:
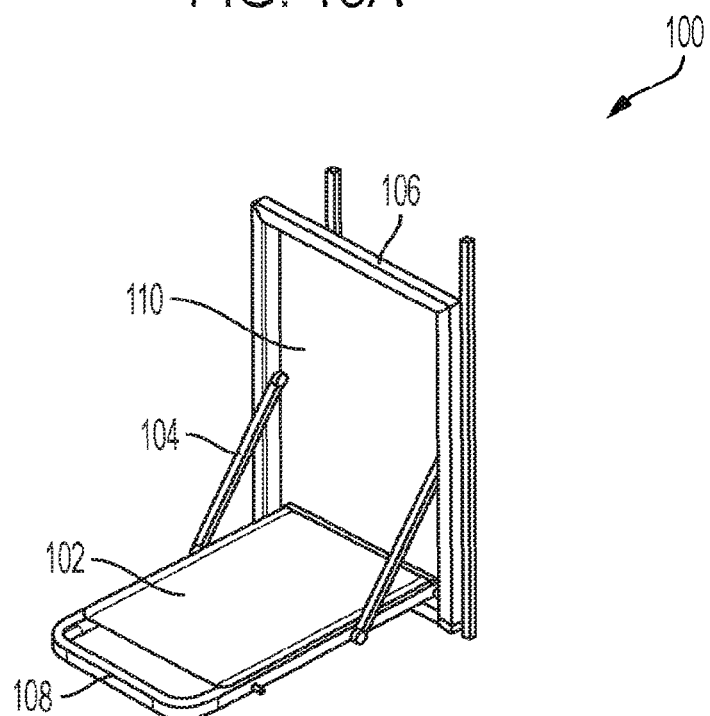
FIG. 15B depicts a perspective view of the shelf in the open configuration, according to an embodiment of the present disclosure.

FIG. 15A depicts a perspective view of the shelf 100 in the closed configuration, according to an embodiment of the present disclosure. FIG. 15B depicts a perspective view of the shelf 100 in the open configuration, according to an embodiment of the present disclosure. As shown in FIG. 15A, the platform 102 of the shelf 100 is mounted to frame 108 of the shelf 100. The shelf 100 also includes a frame 106 that is configured to be mounted to the lateral panel 39A or 39B. The frame 108 of the shelf 100 is pivotally mounted to the frame 106 of the shelf 100 such that the platform 102 that is mounted to the frame 108 is configured to close or open an opening 110 defined by the frame 106. A lock 109 may be provided to hold the platform 102 and the frame 108 in the vertical closed configuration when the shelf is not in use. The two arms 104 that are coupled to the frame 106, which is mounted to the lateral panel 39A and/or panel 39B, can be used to support the platform 102 in the open relatively horizontal configuration when in use. In the open horizontal configuration, an object such as a package(s) or a tool(s) can be placed on the platform 102 of the shelf 100. Therefore, the shelf 100 provided on the cart 30 can provide additional workspace for holding a package or other object of a user, for example.

As shown in FIG. 3, the cart 30 has four sides. A long side is closed by the back panel 38. Two short sides are closed by the two lateral panels 39A and 39B. The fourth side 43 of the cart 30 is kept open. This open fourth side 43 can be used to access the interior space of the cart 30 to load items on the platform 36 of the cart 30. One or more straps 44 are provided on the fourth side 43 to hold the package inside the cart 30 and to prevent the items from falling out of the cart 30. The one or more straps 44 can be attached to each vertical member of frame 40 of lateral panels 39A and 39B. The one or more straps 44 may include two strap portions that can be fastened to each other using any type of clip or fastener. Although a pair of straps is shown used in FIG. 3, as it is understood, one, two, three or more straps can be used as desired. For example, FIG. 6 depicts three straps being used for holding items inside the cart 30. Although straps are described herein being used to hold items inside the cart 30, other types of holding devices can also be used. For example, plates made of metal or plastic can be coupled to the lateral panels 39A or 39B or both via hinges and used to operate in a similar fashion as "gates" to partially close the open-side 43.

Figure 8:
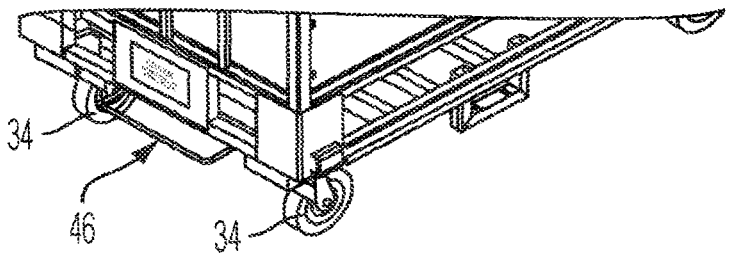
FIG. 8 is a perspective view of the stocking cart showing a brake mechanism and wheels (casters), according to an embodiment of the present disclosure.

The cart 30 further includes a brake mechanism 46. FIG. 8 is a perspective view of the cart showing the brake mechanism and wheels (casters), according to an embodiment of the present disclosure. A caster is a wheel mounted to a rotating mount so that the wheel is allowed to rotate (360 degrees). The brake mechanism 46 is also shown in FIGS. 4 and 5. The brake mechanism 46 is provided to at least two wheels on one of the short sides (i.e., side of lateral panel 39A or 39B) to brake both wheels 34 substantially simultaneously (i.e., both wheels are stopped at the same time). The wheels 34 can also be configured to rotate around a vertical axis (axis perpendicular to the platform 36) to enable a user to direct the cart 30 more easily. The cart 30 includes a rotation locking mechanism 48 that is configured to lock or unlock a rotation of wheels (casters) 34 around a vertical axis (i.e., axis substantially perpendicular to the platform).

Figure 9:
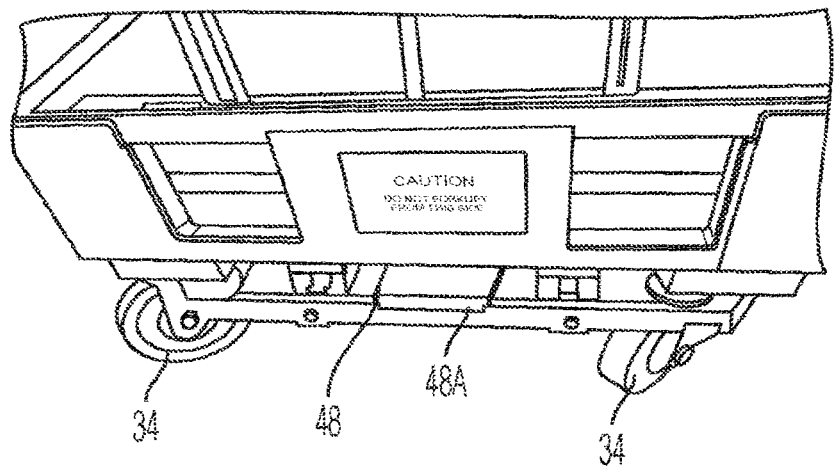
FIG. 9 is a lower view of the stocking cart showing a rotation locking mechanism for locking and unlocking a rotation of wheels of the stocking cart, according to an embodiment of the present disclosure.

FIG. 9 is a lower view of the cart showing the rotation locking mechanism 48 for locking and unlocking a rotation of the wheels 34, according to an embodiment of the present disclosure. For example, the cart 30 may have all wheels 34 unlocked so that the wheels 34 are allowed to rotate around the vertical axis. The wheels 34 can be aligned and when a lever 48A of the rotation locking mechanism 48 is switched up, the wheels 34 lock into place. The lever 48A is also shown in FIGS. 4 and 5. When the wheels are aligned and locked, the cart 30 can only be moved in a straight line. However, when the lever 48A of the rotation locking mechanism 48 is stepped on by a user's foot and switched down, the wheels 34 are allowed again to rotate 360 deg. around the vertical axis. In this way, a user can make turn with the cart 30 and thus can more easily guide the cart 30 to a desired location.

Figure 10:
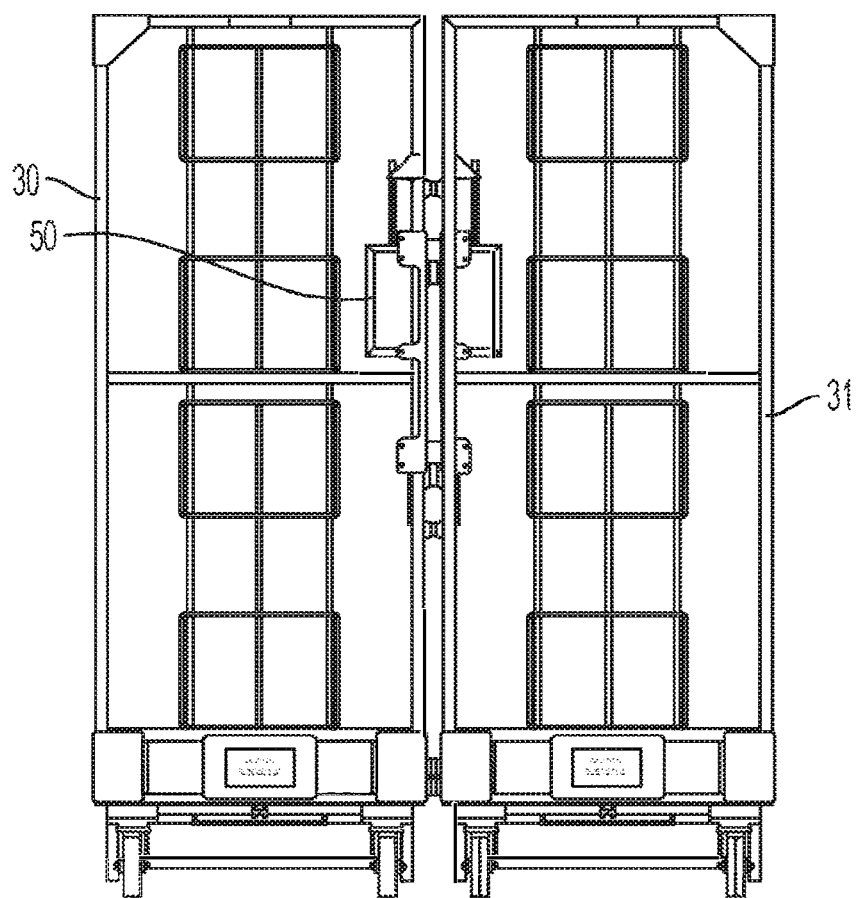
FIG. 10 is lateral view showing two stocking carts connected or linked together using a linking mechanism, according to an embodiment of the present disclosure.
Figure 11:
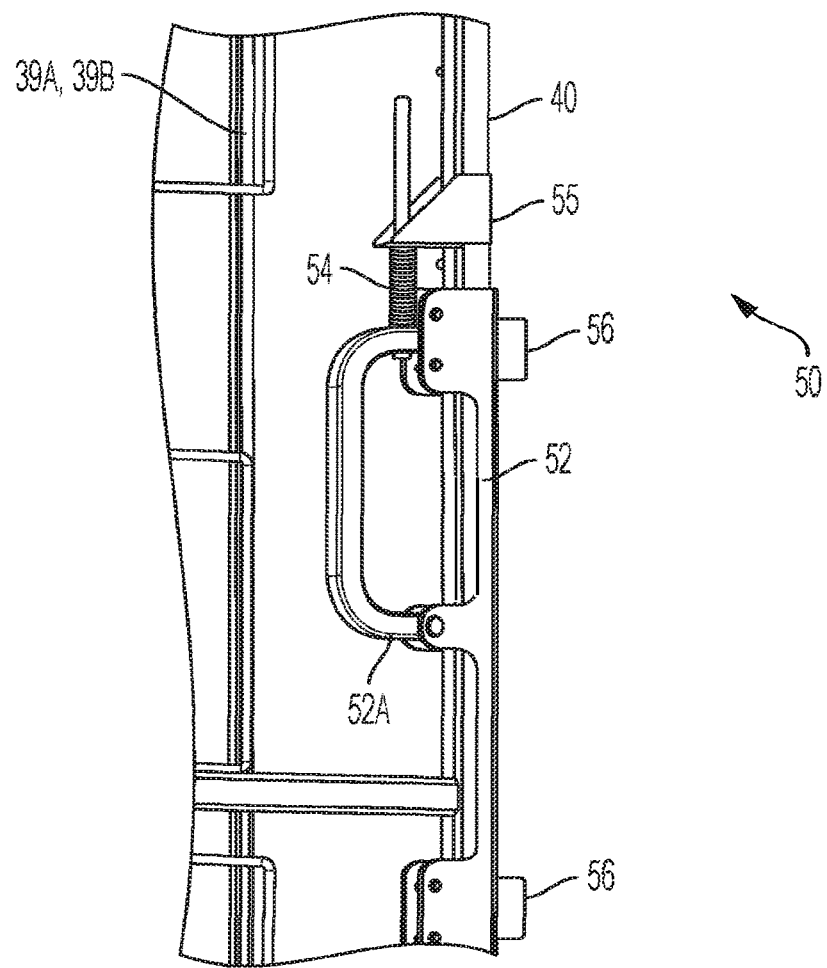
FIG. 11 shows a perspective view of the linking mechanism, according to an embodiment of the present disclosure.

The cart 30 is configured to be connected or to be linked to another cart 31. FIG. 10 is lateral view showing two carts 30 and 31 connected or linked together using a linking mechanism 50, according to an embodiment of the present disclosure. FIG. 11 shows a perspective view of the linking mechanism 50, according to an embodiment of the present disclosure. The linking mechanism 50 comprises a latch 52 that is mounted to the frame 40 of the side panel 39A and/or side panel 39B. In an embodiment the latch 52 is provided with a handle 52A so as to facilitate manipulation of the latch 52. The latch 52 is configured to slide up and down on the frame 40. The latch 52 is biased by a resilient member (e.g., a spring) 54. An end of the spring 54 abuts a fixed member 55 that is fixedly attached to the frame 40. An opposite end of the spring 54 abuts the latch 52 so as to bias the latch 52 in a vertical direction (e.g., downward direction).

FIG. 11 shows the resilient member 54 in a compressed state when a force is applied to the latch 52 in an upward direction. The latch 52 is also provided with mating linking members 56.

Figure 12:
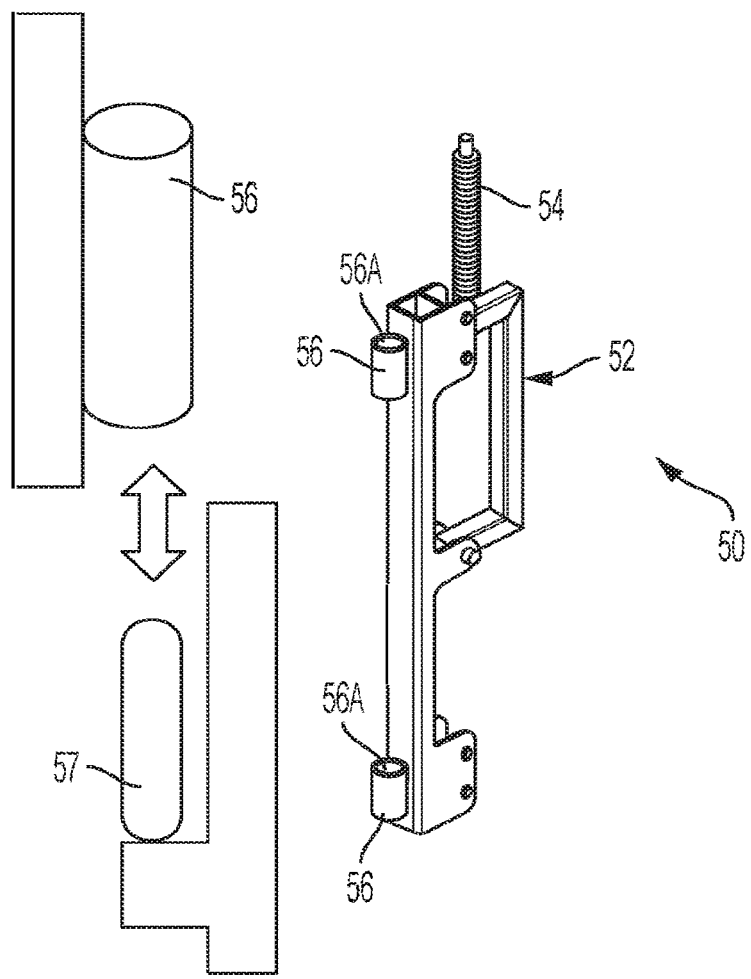
FIG. 12 depicts a latch of the linking mechanism not mounted to the side panel of the stocking cart showing mating linking members of the latch, according to an embodiment of the present disclosure.

FIG. 12 depicts the latch 52 not mounted to the side panel 39A, 39B and shows the mating linking members 56 of the latch 52, according to an embodiment of the present disclosure. As shown in FIG. 12, the mating linking members 56 are part of the latch 52 and can be in the form of cylinders provided with holes or openings 56A. Although the mating linking members 56 are shown having a cylindrical configuration, the mating linking members 56 can also have a rectangular shape, a polygonal shape or any holed shape. In this embodiment, the mating linking members 56 are female. The mating linking members 56 are configured to mate with opposite mating linking members 57 provided on a counterpart frame of a lateral panel of the other cart 31. In this embodiment, the mating linking members 57 are male.

Figure 13:
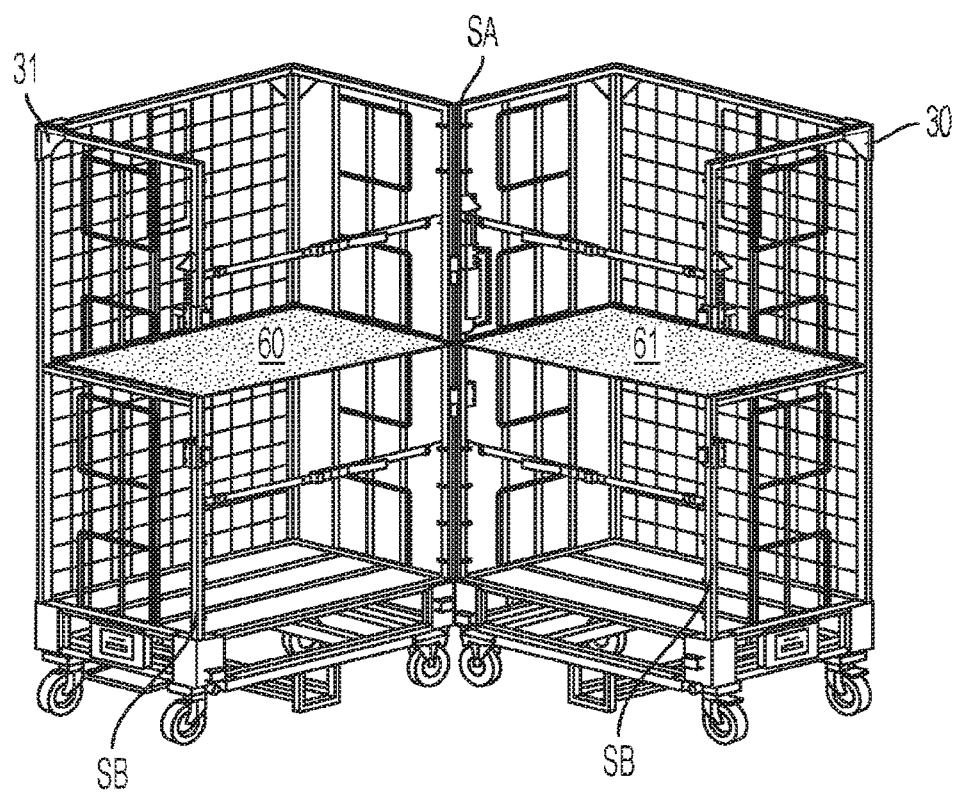
FIG. 13 is a perspective view of two stocking carts that are linked on one side using the linking mechanism, according to an embodiment of the present disclosure.

As illustrated in FIG. 12, the female linking members 56 can be brought into mating with the male linking members 57. For example, a user may lift the latch 52 upwardly against the biasing force of the resilient member 54. When the female linking members 56 are above the male linking members 57, the user may release the latch 52 and the biasing force of the resilient member 54 will push the female linking members 56 against the male linking members 57. In this way, the user links one side of cart 30 to one side of cart 31 (as illustrated in FIG. 13). The user can repeat this operation to mate male and female linking members located on an opposite side of the carts 30 and 31 to link the other side of the cart 30 to the other side of cart 31. Although linking members 56 and 57 are described herein as being, respectively, female and male linking members, as it can be appreciated the linking members 56 and 57 can also be male and female, respectively. In the latter case, the linking members 56 that are provided on the latch 52 can be male linking members (for example, rods or cylinders). Although two linking members 56 are shown herein being provided on the latch 52, as it can be appreciated one, two, three or more linking members can be used as desired. In addition, more or less latches may be provided on the carts.

FIG. 13 is a perspective view of two carts 30 and 31 that are linked on one side SA using the linking mechanism 50, according to an embodiment of the present disclosure. In an embodiment, additional shelves 60, 61 can be provide inside the carts 30 and/or 31 to partition the space inside the cart 30 and/or cart 31 to provide additional loading space. Although, each cart 30 and 31 is shown in FIG. 13 being partitioned with shelves 60 and 61, respectively, any number of shelves can be provided to cart 30 and/or provided to cart 31.

In an embodiment, after loading the two carts 30 and 31 with items, the two carts 30 and 31 are then linked to each other to form together a "single" wheeled cart with 8 wheels. The two carts 30 and 31 linked or connected together at side SA using linking mechanism 50 and then are connected together at side SB using another linking mechanism 50. The linking mechanism 50 is configured and arranged to connect the cart 30 to cart 31 such that the fourth side (the open side having the straps) of cart 30 faces a fourth side (open side having also straps) of cart 31. The two carts 30 and 31 which are thus linked together can be rolled to a desired location or lifted to higher grounds using, for example, a forklift. In an embodiment, when using a forklift to lift the linked two carts 30 and 31, the fork in the forklift can be inserted through both rectangular openings 37 of the two carts 30 and 31. Openings 37 are provided on the long side (i.e., on the back panel 38 side and facing open fourth side 43) of the carts 30 and 31. When the carts 30 and 31 are linked together, the rectangular openings 37 of carts 30 and 31 become aligned and the fork of the forklift can, for example, traverse the length of both short sides of the carts 30 and 31. This provides for a greater stability when lifting the two carts 30 and 31.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Although the embodiments of disclosure have been described in detail for the purpose of illustration based on what is currently considered to be the most practical, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A cart, comprising:
a base;
a lower platform mounted to the base;
a back panel mounted to the base;
a first lateral panel including a shelf pivotally mounted to a frame of the first lateral panel;
an opening side of the cart open to provide access to an interior space of the cart; and
a linking mechanism configured to couple the cart to another cart.

2. The cart of claim 1, further comprising:
a set of lateral panels, wherein the set of lateral panels include the first lateral panel and a second lateral panel mounted to the base, the set of lateral panels forming a second lateral side and a third lateral side of the cart.

3. The cart of claim 2, wherein the first lateral panel and the second lateral panel are attached to the back panel.

4. The cart of claim 2, wherein the first lateral panel includes a first frame and at least one first sub-panel that is removably mounted to the first frame and the second lateral panel comprises a second frame and at least one second sub-panel that is removably mounted to the second frame, wherein the at least one first sub-panel or the at least one second sub-panel is removable to provide access to the interior of the cart to load and unload items.

5. The cart of claim 1, further comprising at least one strap on the opening side of the cart, the opening side of the cart being open to load items to or unload items from the cart, the at least one strap being configured to hold one or more items inside the cart.

6. The cart of claim 5, wherein the at least one strap is attached to a vertical member of a first lateral panel and to a vertical member of a second lateral panel.

7. The cart of claim 1, further comprising:
a plurality of wheels coupled to the base; and
a brake mechanism configured to brake at least two wheels in the plurality of wheels, wherein the brake mechanism is configured to brake the at least two wheels substantially simultaneously.

8. The cart of claim 1, further comprising:
a plurality of wheels coupled to the base, wherein at least two wheels of the plurality of wheels are configured to rotate around a vertical axis that is substantially perpendicular to the lower platform to enable guiding and directing the cart.

9. The cart of claim 1, further comprising:
a plurality of wheels coupled to the base; and
a rotation locking mechanism configured to lock and unlock a rotation of at least two wheels of the plurality of wheels around a vertical axis.

10. The cart of claim 1, wherein the linking mechanism includes at least one latch mounted to at least one of a first frame of a first lateral panel, a second frame of a second lateral panel, or both the at least one latch being configured to slide up and down on the first frame of the first lateral panel or the second frame of the second lateral panel.

11. The cart of claim 10, wherein the at least one latch includes a handle.

12. The cart of claim 10, wherein the at least one latch is biased by a resilient member and an end of the resilient member abuts the first frame or the second frame or both and an opposite end of the resilient member abuts the at least one latch so as to bias the at least one latch in a vertical direction.

13. The cart of claim 10, wherein the at least one latch includes one or more mating linking members, and wherein the one or more mating linking members are configured to mate with opposite mating linking members on a counterpart frame of a lateral panel of the another cart.

14. A method of transporting items using connected carts, comprising:
receiving a first cart and a second cart at a first location, the first cart and the second cart being coupled together using a linking mechanism;
decoupling the first cart and the second cart from each other;
moving the first cart and the second cart to a second location different than the first location; and
unloading the first cart and the second cart, at least one of the first cart and the second cart including a first lateral panel having a shelf, the shelf being pivotally mounted to a frame of the first lateral panel.

15. The method of claim 14, further comprising loading the first cart and the second cart and coupling the first cart and the second cart using the linking mechanism at a third location prior to receiving the first cart and the second cart at the first location.

16. The method of claim 14, wherein the first cart and the second cart include:
a base;
a lower platform mounted to the base;
a back panel mounted to the base;
an interior space of the first cart and the second cart; and
an opening side of the first cart and the second cart open to provide access to the interior space of the first cart and the second cart.

17. The method of claim 14, wherein the linking mechanism includes at least one latch that is mounted to a first frame of the first lateral panel or to a second frame of a second lateral panel or both, the at least one latch being configured to slide up and down on the first frame of the first lateral panel or the second frame of the second lateral panel.

18. The method of claim 17, wherein the at least one latch is biased by a resilient member and an end of the resilient member abuts the first frame or the second frame or both and an opposite end of the resilient member abuts the at least one latch to bias the at least one latch in a vertical direction.

19. A transport system having a plurality of connected carts, the transport system comprising:
a first cart and a second cart coupled to the first cart, the first cart and the second cart including:
a base;
a lower platform mounted to the base;
a back panel mounted to the base;
a first lateral panel including a shelf, the shelf being pivotally mounted to a rectangular frame of the lateral panel;
an opening side of the first cart and the second cart open to provide access to an interior space of the first cart and the second cart; and
a linking mechanism configured to couple the first cart to the second cart.

20. The transport system of claim 19, wherein the linking mechanism includes at least one latch that is mounted to a first frame of the first lateral panel or to a second frame of a second lateral panel, or both, the at least one latch being configured to slide up and down on the first frame of the first lateral panel or the second frame of the second lateral panel.

\* \* \* \* \*